June 17, 1930.  W. A. KYSOR  1,764,799
HEATING MEANS FOR MOTOR VEHICLES
Filed July 20, 1928  2 Sheets-Sheet 1
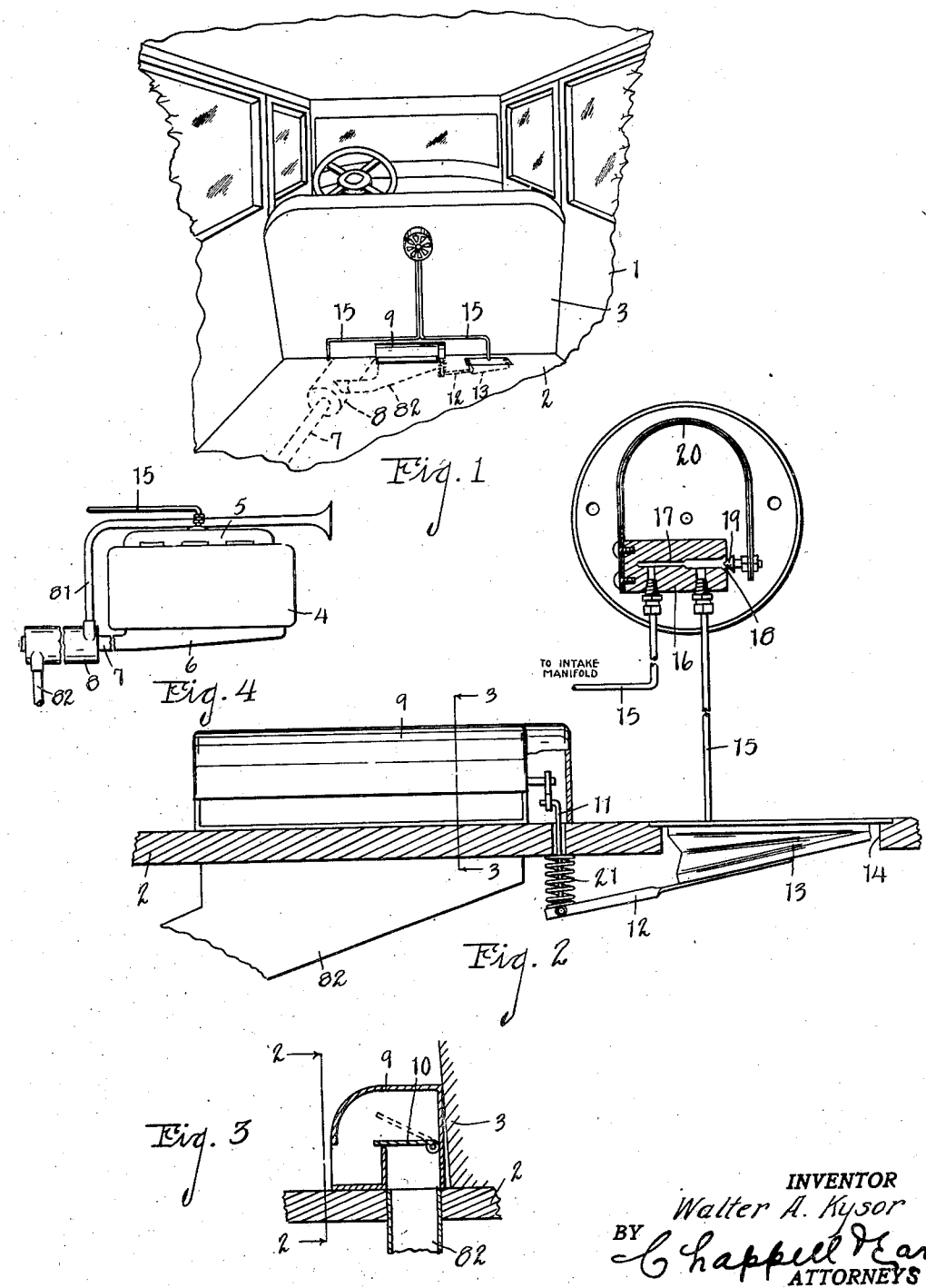
INVENTOR
Walter A. Kysor
BY Chappell & Earl
ATTORNEYS

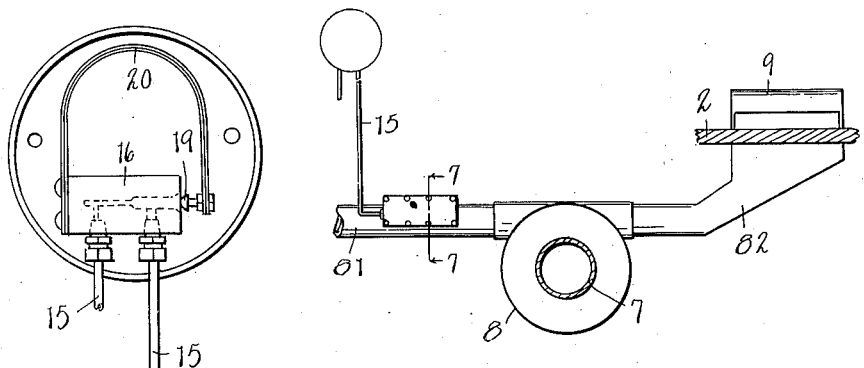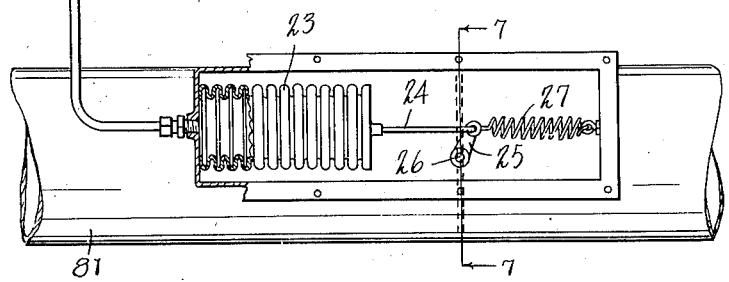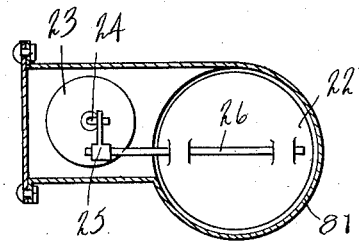

Patented June 17, 1930

1,764,799

UNITED STATES PATENT OFFICE

WALTER A. KYSOR, OF CADILLAC, MICHIGAN

HEATING MEANS FOR MOTOR VEHICLES

Application filed July 20, 1928. Serial No. 294,246.

The main object of this invention is to provide an improved heating means for motor vehicles which is automatically controlled.

A further object is to provide an apparatus of this character which is simple in its parts and readily installed in vehicles of various makes now on the market.

Objects pertaining to details and economies of my invention will definitely appear from the description to follow. The invention is defined in the claims. A structure which embodies my invention is clearly illustrated in the accompanying drawing, in which:

Fig. 1 is a side perspective view of a motor vehicle embodying the features of my invention, no attempt being made to illustrate the structural details of the body and only such parts being illustrated as are deemed necessary to illustrate a practical embodiment of my improvements.

Fig. 2 is a detail view partially in section and partially diagrammatic of certain features of my invention, the floor of the vehicle being sectioned on line 2—2 of Fig. 3 and the control valve being also sectioned.

Fig. 3 is a detail section on line 3—3 of Fig. 2.

Fig. 4 is a view showing in conventional relation the motor, heater and intake connection.

Fig. 5 is a detail view partially in section of a modified form or adaptation of my invention.

Fig. 6 is an enlarged detail of parts shown in Fig. 5.

Fig. 7 is a transverse section on a line corresponding to line 7—7 of Figs. 5 and 6.

Referring to the drawing, 1 represents a vehicle body, 2 the floor thereof and 3 the back of the front seat. An engine is conventionally shown at 4 and is provided with an intake manifold 5 and an exhaust manifold 6. The pipe 7 leads from the exhaust manifold to an air heater 8 which is preferably of the structure shown in my Patent No. 1,627,855 issued May 10, 1927.

This heater is provided with an inlet pipe connection 81 and a discharge 82 connected to the register box 9 positioned at the rear of the front seat 3. The register box has a valve 10 controlling the delivery of heated air from the heating unit. This valve is connected by the rod 11 to an arm 12 on the bellows or pneumatic 13 which, in the embodiment illustrated in Fig. 2 is set into an opening 14 in the floor. This pneumatic is operatively connected to the intake manifold 5 of the engine by the conduit 15. This conduit has a valve casing 16 connected therein, the passage 17 of which has a port 18 opening to the atmosphere. The valve 19 controlling this port is carried by a bowed thermostatic element 20 which is arranged so that when the temperature falls below a predetermined point the valve 19 is closed. In the event of the engine being in operation the pneumatic is actuated, owing to the suction of the intake manifold, thereby opening the heat control valve 10. A spring 21 normally holds the heat control valve or register-box valve in its closed position.

As soon as the temperature rises above a predetermined point the thermostatic element acts to open the valve 19, thereby breaking the suction in the conduit 15 and allowing the pneumatic to expand and the valve 10 to close.

In the modification shown in Figs. 5, 6 and 7, the control valve 22 is arranged in the air intake conduit 81 of the heating unit 8. Instead of the bellows type of pneumatic 13 shown in Fig. 2, I provide a metallic pneumatic 23 which is operatively associated with the conduit 15 and is connected by the link 24 to an arm 25 on the spindle 26 of the valve 22. A spring 27 acts to close the valve.

I thus provide a control means which is entirely automatic. My improvements may be readily embodied in motor vehicles of various makes now in extensive use, either as an attachment or built into the vehicle.

I have illustrated my improvements in a simple and practical embodiment with certain parts in conventional form but it is believed that the disclosure made will enable those skilled in the art to embody or adapt my improvements as may be desired.

Having thus described my invention what I claim as new and desire to secure by Letters Patent is:

1. The combination with a motor vehicle body and an internal combustion engine, of an air heating unit operatively associated with the exhaust of said engine, an air discharge connection from said heating unit to the vehicle body provided with a control valve, a pneumatic operatively connected to said valve, a conduit connecting said pneumatic to the intake of said engine, said conduit having an air inlet port open to the atmosphere, a valve for said port, and a thermostatic control means for said valve located within the vehicle body.

2. The combination with a motor vehicle body and an internal combustion engine, of an air heating unit operatively associated with the exhaust of said engine, an air discharge connection from said heating unit to the vehicle body provided with a control valve, a pneumatic operatively connected to said valve, a conduit connecting said pneumatic to the intake of said engine, a valve for said conduit, and a thermostatic control means for said valve located within the vehicle body.

3. The combination with a motor vehicle body and an integral combustion engine, of an air heating unit operatively associated with the exhaust of the engine and connected to deliver heated air to the vehicle body, a valve for controlling the circulation of air to the vehicle body, a pneumatic operatively connected to said air heating control valve, a suction connection from said pneumatic to the intake manifold of the engine, and a control valve for said suction connection provided with a thermostatically actuating means located within the vehicle body.

In witness whereof I have hereunto set my hand.

WALTER A. KYSOR.